United States Patent
Patel et al.

(10) Patent No.: US 6,634,558 B1
(45) Date of Patent: Oct. 21, 2003

(54) OPTICAL CODE READER WITH HAND MOUNTED IMAGER

(75) Inventors: Mehul Patel, Fort Salonga, NY (US); Craig Hiller, West Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 161 days.

(21) Appl. No.: 09/684,514

(22) Filed: Oct. 10, 2000

Related U.S. Application Data (63) Continuation-in-part of application No. 09/133,666, filed on Aug. 12, 1998, now abandoned.

(51) Int. Cl.[7] .................................................. G06K 7/10
(52) U.S. Cl. .......................... 235/472.01; 235/462.44; 235/462.45; 235/462.01; 235/472.02
(58) Field of Search ........................... 235/454, 462.43, 235/462.45, 462.46, 472.01, 472.02, 462.44

(56) References Cited

U.S. PATENT DOCUMENTS

| | | | |
|---|---|---|---|
| 4,805,175 A | * | 2/1989 | Knowles ................ 235/462.45 |
| 5,198,657 A | | 3/1993 | Trost |
| 5,543,610 A | | 8/1996 | Bard et al. |
| 5,550,366 A | | 8/1996 | Roustaei |
| 5,635,697 A | | 6/1997 | Shellhammer et al. |
| 5,703,349 A | | 12/1997 | Meyerson et al. |
| 5,750,977 A | * | 5/1998 | Suzuki .................. 235/472.01 |
| 5,756,981 A | | 5/1998 | Roustaei et al. |
| 5,786,585 A | * | 7/1998 | Eastman et al. ....... 235/462.15 |
| 5,814,803 A | | 9/1998 | Olmstead et al. |
| 5,856,660 A | * | 1/1999 | Bard et al. ............. 235/462.15 |
| 5,925,867 A | * | 7/1999 | Hagimoto ................ 235/454 |
| 5,984,187 A | * | 11/1999 | Knowles et al. ....... 235/462.44 |
| 5,992,750 A | * | 11/1999 | Chadima et al. ....... 235/472.01 |

OTHER PUBLICATIONS

U.S. patent application Ser. No. 09/096,578 filed Jun. 12, 1998, Mark Correa et al.
U.S. patent application Ser. No. 09/096,348 filed Jun. 12, 1998, Duanfeng He et al.
U.S. patent application Ser. No. 09/133,666 filed Aug. 12, 1998, Mehul Patel et al.
U.S. patent application Ser. No. 09/096,164 filed Jun. 12, 1998, Duanfeng He et al.

* cited by examiner

*Primary Examiner*—Michael G. Lee
*Assistant Examiner*—Ahshik Kim
(74) *Attorney, Agent, or Firm*—Kirschstein, et al.

(57) ABSTRACT

An optical imager includes an image sensor, an objective lens having an optical axis for directing an image of a target onto the image sensor, at least one circuit board carrying circuitry connected to the image sensor for providing electronic signals corresponding to information for a target image, a reflective element incident to the optical axis for reflecting the target image onto the image sensor, and wherein the image sensor is arranged such that it is not incident to the optical axis. The imager is sufficiently compact such that it can be worn on a finger of a user.

12 Claims, 11 Drawing Sheets

OPTICAL CODE READER WITH HAND MOUNTED IMAGER

This application is a Continuation-in-Part of copending U.S. patent application Ser. No. 09/133,666 filed Aug. 12, 1998, abandoned to which the Applicant hereby claims priority under 35 U.S.C. §120.

FIELD OF THE INVENTION

The invention relates to optical imaging and code reading devices. More particularly, the invention relates to a CCD-based imaging apparatus having an imaging engine that is mounted on the hand of the user. A preferred embodiment is a ring imager with a separate decoding unit in communication with the ring imager.

BACKGROUND OF THE INVENTION AND OBJECTS

Imaging devices are frequently used for identifying or extracting data from optical codes and are sometimes referred to as "optical code readers", of which barcode scanners are one type. Optical code readers are used in both fixed and portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. The optical code reader usually includes a scanner which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described may also be applicable to some associated image recognition or analysis.

Many scanners in use today employ a scanning laser beam. One example of such a system is disclosed in U.S. Pat. No. 5,543,610 to Bard et al. and assigned to Symbol Technologies Inc., the disclosure of which is incorporated herein by reference. The bar code scanning arrangement described therein includes a scanning unit having first housing adapted to be worn on a user's finger. The first housing contains a device for generating and directing a scanning laser beam onto a target. The scanning light beam is reflected off the target and received by the scanning unit. An electrical signal is generated in response to the reflected light, which is then sent to a signal processor contained within a second housing. Such an arrangement advantageously affords the operator use of both hands.

In another form of scanning device, it is known in the art to use an image sensor which has a two dimensional array of photo sensors. One such sensor comprises a charge coupled device (CCD) photo detector and objective lens assembly disposed in an optical code reader. One example of such an arrangement can be found in U.S. Pat. No. 5,550,366 to Roustaei. The device disclosed therein includes focusing and receiving optics, a CCD detector array mounted to a printed circuit board, a storage buffer, and a decoder, all contained within the same housing which is adapted to be worn on the back of a user's hand.

It is an object of the present invention to provide an imaging device including an imaging scanner unit which is sufficiently compact such that it can be contained within a housing adapted to be worn on the user's finger, and a second separate decoder unit which may be worn about the user's wrist.

SUMMARY OF THE INVENTION

The present invention relates to methods and apparatus useful in imaging, for example, in optical code readers. Techniques are disclosed which are applicable to the design of imaging engines, imaging lens systems, illumination, and signal processing devices associated with code readers of various types.

An optical scanning unit or imager constructed according to the principles of the present invention may comprise an image sensor, an objective lens having an optical axis for directing an image of a target onto the image sensor, at least one circuit board carrying circuitry connected to the image sensor for providing electronic signals corresponding to information for a target image, a reflective element incident to the optical axis for reflecting the target image onto the image sensor, and wherein the image sensor is arranged such that it is not incident to the optical axis. The optical scanning unit is sufficiently compact such that it can be easily worn on the fingers of the user, preferably on a single finger of the user. Alternatively, the optical scanning unit may be worn on the back of the user's hand.

The housing of the optical scanning unit may contain an illumination apparatus, lens assembly, image sensor and support circuitry. Optionally, an aiming system may also be incorporated into the optical reading unit.

An imaging apparatus constructed according to a further embodiment of the present invention comprises an optical scanning unit and a decoder unit.

According to the present invention, the decoder unit can comprise a housing that can be made sufficiently compact such that it can be worn on the wrist of the user. The decoder unit housing contains a receiver/amplifier, analog/digital converter, FPGA circuitry, power supply and associated power supply control, microprocessor and associated memory devices. Optionally, a device for transmitting information to a remote apparatus, such as a serial port and/or a radio transmitter may also be incorporated into the decoder unit.

An imaging apparatus for the optical code reader may be based on a solid-state image sensor, including an array of photo sensor cells for producing electronic signals corresponding to a two-dimensional array of pixel information for a field of view. Such image sensors include CCD, CMOS, CMD, or CID devices. In preferred embodiments, the image sensor is a CCD. A compact lens assembly is provided for focusing light onto the image sensor.

In certain embodiments, the imaging unit housing is less that two cubic inches in volume, for example, approximately 1.61 cubic inches in volume or less, and is dimensioned to replace a moving laser beam scanning engine in conventional ring scanner units. Such an imaging scanner may be designed to read a variety of types of optical codes.

The imaging systems of the present invention may further include frame grabbing circuitry for providing video signals for displaying images produced by the apparatus on a terminal monitor. In this case hardware modification of existing terminals may be avoided.

In preferred embodiments of the present invention the lens assembly includes compound lenses made up of multiple lens elements aligned on the same optical axis. In other preferred embodiments, the lenses have apertures less than 1/10 inch in diameter. The lenses themselves may include inexpensive molded plastic spherical lens elements. Each lens may include two concave-convex lenses with spherical convex surfaces and diameters less than ½ inch. The lens elements may be snap fit in an alignment tube or barrel to maintain the lenses in position on a common optical axis in back-to-back relationship.

Imaging unit embodiments of the present invention may also include a target illumination source which emits light from a forward face of the engine. The illumination source may comprise plural light emitting diodes, each associated with a focusing lenslet located in a front face of the reader. The illumination source may have two or more illumination fields or beams. In an illumination system using plural light emitting elements, certain intensity variations may occur across the illuminated field. In preferred embodiments of the present invention, image processing circuits and/or software compensates signals from the image sensor for known variations in illumination provided by the illumination source.

Aspects of imaging engine design are as described in detail in commonly assigned U.S. patent application Ser. No. 09/096,578, the disclosure of which is incorporated herein by reference.

Preferred embodiments may include circuitry and/or software for processing and decoding image data received from the image sensor. An image sensor produces electronic signals corresponding to a two-dimensional array of pixel information for a target image. This data is analyzed by circuitry/software based systems to determine black and white threshold information. The pixel data is divided into subimages, for example, 32×32 pixel subimages. These subimages are analyzed for properties known to be associated with various types of optical codes and known to distinguish a particular code from other codes and from environmental (non-code) images. In preferred embodiments, the ring imager is capable of reading one dimensional and two dimensional bar codes, postal codes and/or Maxi codes.

In preferred embodiments, an auto-discrimination system determines which subimages contain codes of a particular type and the coordinates in the pixel data array of certain boundaries or features of preliminarily identified code areas. Further circuitry and/or software extracts one or more waveforms from the data in image areas of interest. Peaks and valleys in the waveforms are identified. A digitizer converts this information to electronic signals corresponding to the code content of the image. The output of the digitizer is applied to a decoder which provides a decoded data output or indicates a failure to decode, which may then trigger additional auto-discrimination in a further attempt to identify and locate a decodable image.

Methods and systems for digitization, auto-discrimination and line drawing are disclosed in detail in commonly assigned U.S. patent application Ser. Nos. 09/096,348 and 09/096,164, the disclosures of which are incorporated herein by reference.

The scope of the present invention is as defined in the claims.

BRIEF DESCRIPTION OF THE DRAWINGS

Mechanical Overview—Board Components, Optics, and Illumination

Objective Lens Assembly

Electrical Arrangement

Signal Processing and Decoding

DETAILED DESCRIPTION OF THE DRAWINGS AND PREFERRED EMBODIMENTS

Table of Contents

I. Mechanical Overview—Board Components, Optics, and Illumination

II. Objective Lens Assembly

III. Illumination

IV. Electrical Arrangement—System Control, Data Flow And Power Supply

V. Signal Processing and Decoding

I. Mechanical Overview—Board Components, Optics, and Illumination

Figure 1:
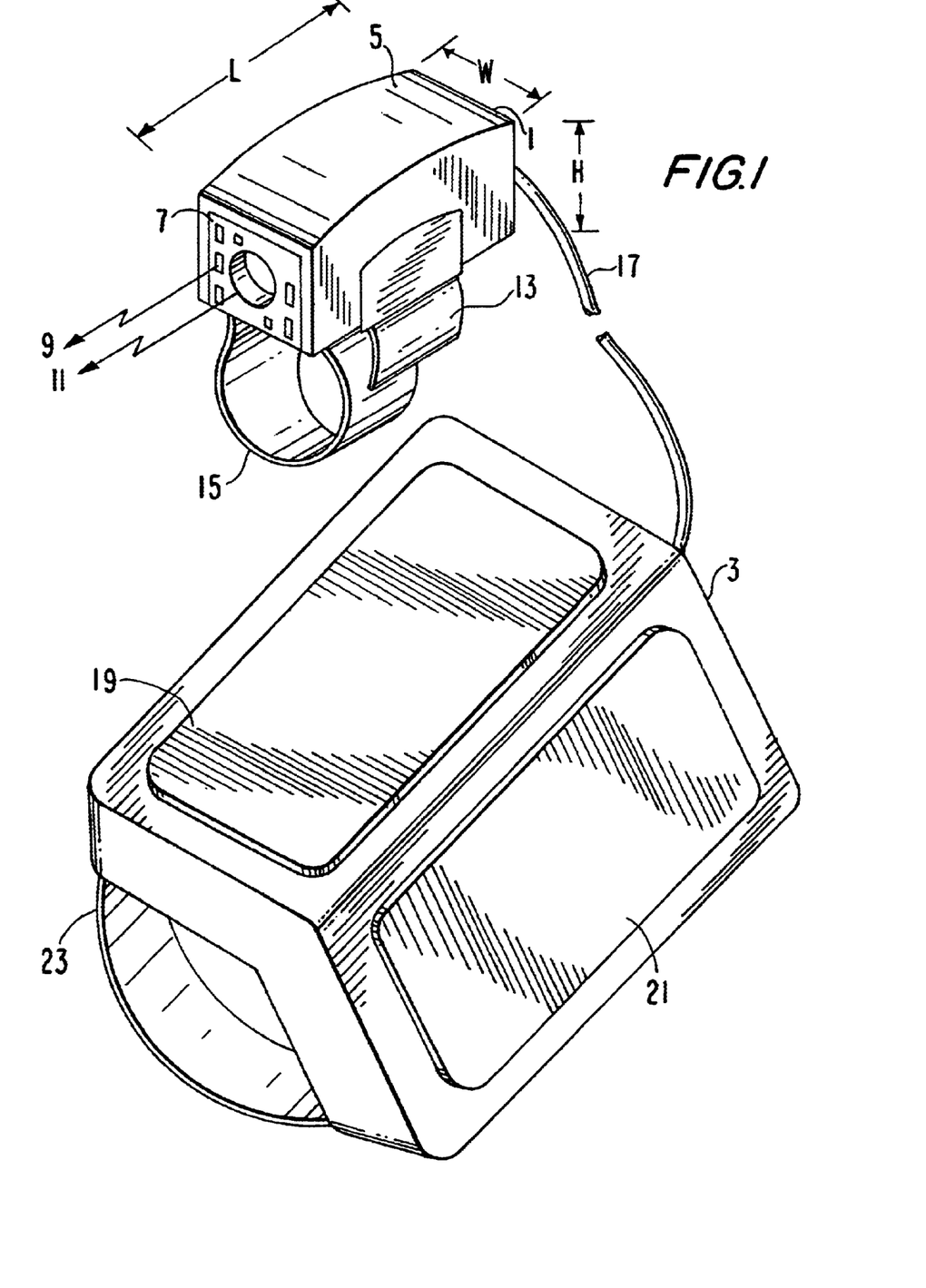
FIG. 1 is a perspective view of an imager and decoder of a preferred embodiment of the present invention.

FIG. 1 illustrates an imaging ring unit 1 containing an imaging engine 2 and an associated decoder unit 3 of an embodiment of the present invention. The ring unit 1 is designed to be compact so that it may be worn on the finger, or fingers, of the user. While the ring unit 1 is configured to be worn on the finger, it is also contemplated that the unit 1 may also be worn on the back of the user's hand. A mounting strap 15 is provided to attach the unit 1 to a user. The ring unit housing is very compact, and is dimensioned such that it is 2.0 cubic inches in volume or less. The length L of the housing is approximately 1.0 inches, the width W of the housing is approximately 1.00 inches, and the height of the housing H is approximately 1.00 inches. For purposes of illustration, the ring unit housing 5 is dimensioned such that it is on the order of 1.61 cubic inches in volume, or less. In one example of a suitably dimensioned ring unit housing, the length L of the housing is approximately 1.75 inches, the width W of the housing is approximately 1.00 inches, and the height of the housing H approximately 0.92 inches. The ring unit 1 of the present invention represents a significant reduction in size when compared with existing ring unit scanners. Moreover, by appropriate packaging of the CCD sensor and redesigning the electronic circuit, a further reduction of the above-mentioned volume on the order of 20–25% is envisioned while continuing to provide the versatility in reading and decoding associated with two dimensional imaging systems.

Figure 1A:
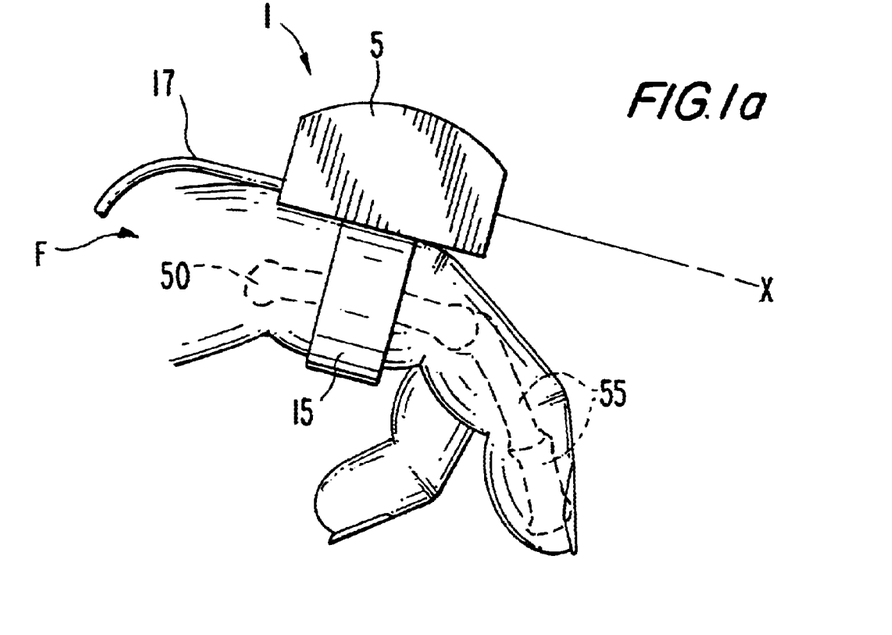
FIG. 1a is a side view of an imager of the present invention mounted to a finger of a user.

FIG. 1a illustrates the ring unit 1, and the associated principal optical axis X, when mounted on the finger F of a user. As noted above, the ring unit 1 and housing 5 are compact. Another useful indication of the size of the ring unit is to compare it to the size of an average sized human finger. As indicated in FIG. 1a, the ring unit housing is approximately the same length as an average size finger segment corresponding to upper phalange 50 of a human finger. The lower phalanges 55 are also shown to complete the illustration.

A ring imaging engine 2 according to the present invention further comprises a front face portion 7 which is directed toward an object to be scanned. The front face includes a plurality of lenslets 9. As will be described in more detail below, lenslets 9 transmit light from an illumination source onto a target object thereby facilitating imaging of target objects in low-light conditions. Front face 7 also has a passage 11 for an input port or objective lens assembly of the imaging engine. A trigger 13 is provided to manually activate the ring unit 1.

Image data generated by the imaging unit 1 is transmitted to the decoder unit 3. A cable 17 connects the ring unit 1 and decoder 3 for the communication of data. Alternatively, it is contemplated that the ring unit 1 and decoder 3 communicate wirelessly, such as through infrared or radio frequency transmissions, or other suitable means.

Decoder 3 houses a decoder board 19 for processing the image data sent from the ring unit 1, as well as a power supply. Preferably, decoder 3 also includes a means of transmitting decoded image data to external devices. For example, decoder 3 may include a SPECTRUM 24 radio transmitter 21, serial port (not shown), or other suitable device. The decoder unit 3 is also compact so that it may be comfortably worn on the wrist of the user. A mounting strap 23 may be provided for this purpose.

Figure 2:
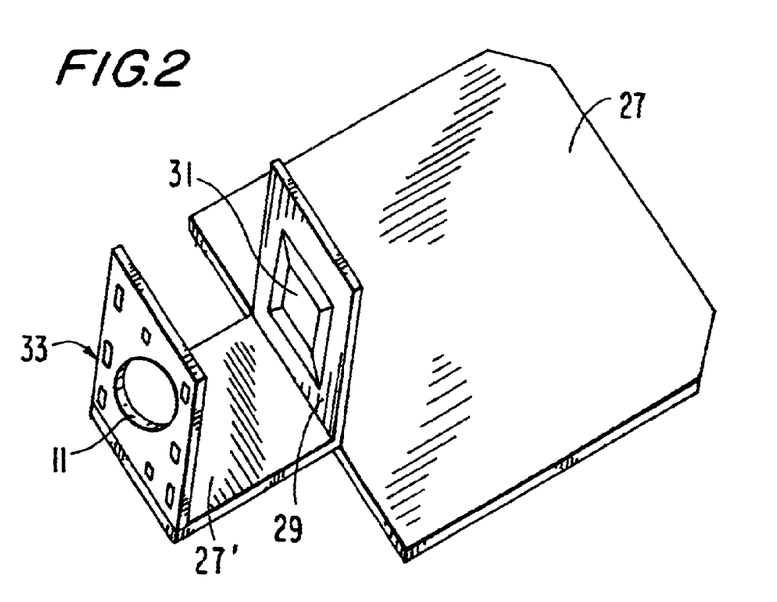
FIG. 2 is a perspective view of certain components of an imager of the present invention.
Figure 3:
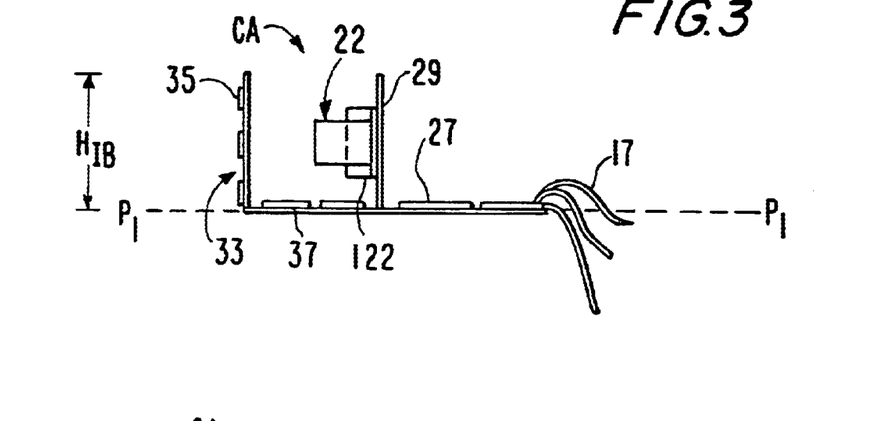
FIG. 3 is a side view of components of the imager of FIG. 2.
Figure 4:
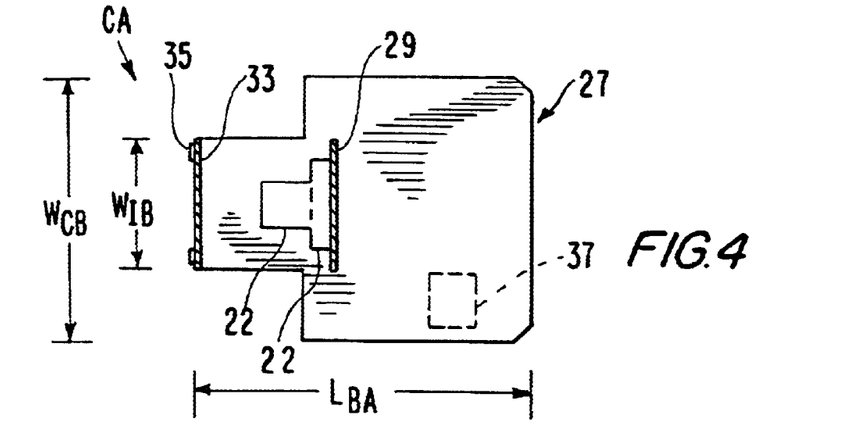
FIG. 4 is a top view of components of the imager of FIG. 2.

FIGS. 2–4 illustrate the arrangement of certain components of one embodiment of an imaging engine contained within a ring unit housing 5. Namely, control board 27 is disposed along a first plane $P_1$ (FIG. 3). Control circuitry board components 37 are disposed on control board 27. An image sensor board 29 and an illumination board 33 are disposed along a forward portion 27' of the control board 27, and are disposed at substantially 90° relative to the control board 27 and plane $P_1$. The image sensor board 29 and illumination board 33 are disposed in a spaced, parallel relationship.

An image sensor 31 is mounted to the image sensor board 29. The image sensor board 29 may also contain image acquisition circuitry associated with the image sensor. In a preferred embodiment, the image sensor 31 is an area Charge Coupled Device (CCD). The CCD converts the incident light into electrical signals which are processed in a manner indicated below. By way of illustration, a suitable CCD is model MN3776AE manufactured by Panasonic (Matsushita Electric Industrial Co.).

The CCD may be contained within a package, such as a 14×10 Dual Inline Package (DIP) package. Alternatively, the image sensor, without packaging, may be directly affixed (surface-mounted) to image sensor board. This alternative facilitates further reduction in size of the image sensor board and ring unit.

Illumination board 33 is preferably substantially parallel to the image sensor board 29, and spaced therefrom. The illumination circuit board 33 carries a plurality of light emitting diodes (LED's) 35. As previously mentioned, the external front face 7 of the imaging ring unit 1 contains a plurality of lenslets 9 that transmit and direct light from LED's onto the target. In preferred embodiments, there are approximately 6 to 8 LED's provided on the illumination board 33, with a corresponding number of lenslets 9 provided in the front face 7. It is may be desirable to decrease the number of LED's/lenslets in order to further reduce the size of the ring unit 1. Conversely, it may be desirable to increase the number of LED's/lenslets in order to improve the effectiveness of the imaging system under low-light conditions.

An optical lens assembly 22 is contained within the space between the image sensor board 29 and illumination board 33. The optical lens assembly 22 may be mounted within the above-described space in any suitable fashion that permits the transmission of light onto the image sensor 31. In one embodiment the lens assembly 22 is held by a surrounding lens assembly holder 122, the holder 122 being attached to the image sensor board.

The assembly of components depicted in FIGS. 2–4 constitute an imaging engine assembly CA, the dimensions of which facilitate the construction of a very compact ring unit scanner 1. In one example of a suitably dimensioned assembly, the height of the illumination board $H_{IB}$ is approximately 0.65 inches, the width of the illumination board $W_{IB}$ is approximately 0.58 inches, the width of the control board $W_{CB}$ is approximately 0.88 inches, and the length of the scanner component assembly (CA) $L_{CA}$ is approximately 1.44 inches.

Figure 5:
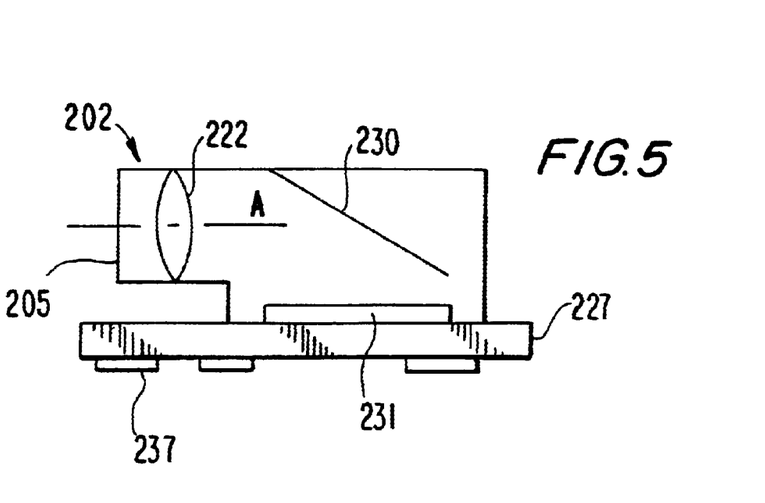
FIG. 5 is a side view of an imaging engine or imager according to a further embodiment of the present invention.

FIG. 5 is illustrative of a further aspect of the present invention. The imaging engine 202 is constructed to achieve a particularly high degree of compactness.

The imaging engine 202 includes a chassis 205. The chassis 205 can take a number of different forms, but generally acts to hold and support various components of the imaging engine 202. It is contemplated that chassis 205 can form the sole housing member so that its exterior surface defines a miniaturized imager, such as a ring imager, as previously discussed. Also, the chassis 205 can act as a sub-housing that is contained within an outer housing member of such an imager (e.g.—housing 5).

A lens 222 is housed within the chassis 205. Lens 222 can have numerous constructions. For instance, lens 222 can comprise a single lens element, or can comprise a multiple component lens assembly. Particularly advantageous lens constructions are discussed in further detail below. As illustrated in FIG. 5, lens 222 has an optical axis A.

A reflective element 230 is also provided within the chassis 205. The reflective element is incident to the optical axis A of the lens 222. The reflective element can comprise any suitable component which is capable of reflecting target object images received from the lens 222. One such component is a mirror. As shown in FIG. 5, the reflective element is at an angle relative to the optical axis A such that images or "input" received from the lens 222 are reflected and transmitted to a specified location within the chassis 205. Preferably, this location is not incident to the optical axis A. The angle formed between the reflective element 230 and the optical axis A can vary, which of course affects the location of the reflected image or input.

Through this arrangement, it is possible to locate a circuit board or control board 227, which preferably includes an image sensor 231, in a location which is not necessarily incident to the optical axis A of the lens 222. Image sensor 231 can comprise any suitable component, as discussed above in connection with image sensor 31.

An imager comprising an imaging engine 202 as described herein, can further include the various components of an imager constructed accord to the previous embodiments, such as illumination boards, a trigger, etc.

A further advantage of this aspect of the present invention is that it is possible to reduce the dimensions of the imaging engine 202 and the overall device (e.g.—ring imager). For example, the image sensor 231 can be located on a horizontal plane or surface that is parallel to the optical axis, thereby reducing the "height" dimension (i.e.—the vertical direction in FIG. 5, normal to the optical axis A and horizontal surface of the board 227). Moreover, since the image sensor 231 can be located on a horizontal surface of the control board 227, along with the other electronic components 237, a separate image sensor board (e.g.—29) is not necessary.

According to the invention, it may also be possible to provide the ring unit with a means for projecting an aiming pattern onto the object to be scanned. This optional aspect of the invention may be achieved by controlling individual LED's and using specially formed lenslets that produce a crisp aiming pattern or target onto the object to be imaged. However, the inclusion of such an aiming mechanism into the imaging scanner in the present invention is not necessary to the successful operation of the device.

II. Objective Lens Assembly

Figure 6:
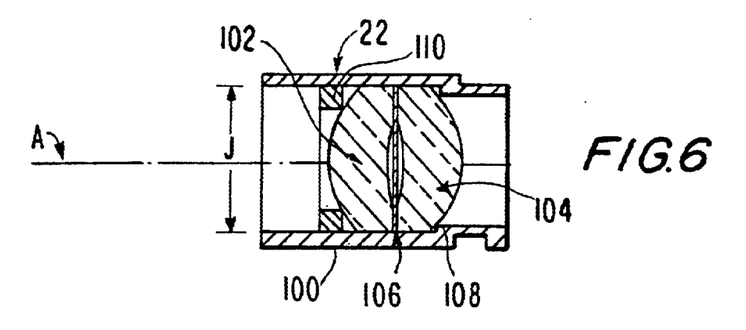
FIG. 6 is a sectional view of an objective lens assembly made in accordance with a preferred embodiment of the present invention.

FIG. 6 is a sectional view of an objective lens assembly 22 suitable for use in an imaging engine of the above-described embodiments of the present invention. The lens assembly 22 may include a barrel or housing 100 which contains two lens elements 102 and 104 and an aperture plate or spacer 106. The lens assembly of FIG. 6 is a symmetrical, two element design. The lens assembly is of small diameter. The lens elements 102 and 104 can be identical lens elements. Advantageously, the lens assembly has an aperture of less than 1/10 inch in diameter. The two lenses 102 and 104 may be concave-convex plastic lens elements with spherical surfaces and diameters of less than ½ inch. The lens assembly is designed to be snap-fit together. As shown in FIG. 6, the lens 104 is aligned along an optical axis A of the lens assembly 22.

During manufacturing, the first lens 104 may be located against a concentric radial flange portion 108 of the barrel 100. The spacer 106 may be inserted followed by the second lens 102 arranged in back-to-back relationship with the first lens 104. A pressure-fit ring 110 may be used to retain the lenses and spacer in tight fitting relationship in the barrel 100. It will be understood that the spacer and lenses are pressed against each other and that only a small gap will be present between the components due to the concave shape of the lenses.

The lens assembly of FIG. 6 is intended to be manufactured as a unit and will not require manual focusing during the manufacturing process. A single spherical plastic lens element design may conveniently be used to mold both lens elements for the lens assembly of FIG. 6.

Figure 7A:
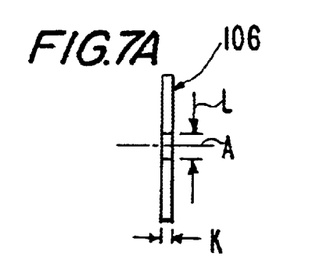
FIGS. 7a and 7b are, respectively, front and cross sectional views of an aperture plate used in the lens assembly of FIG. 6.
Figure 7B:
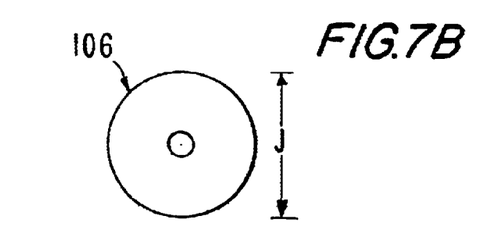

Individual components of the lens assembly of FIG. 6 will now be described in connection with FIGS. 7A, 7B, and 8. FIGS. 7A and 7B are, respectively, cross sectional and front views of an aperture plate or spacer used in the lens assembly of FIG. 6. As illustrated in 7B, the aperture plate has a dimension J which corresponds to the inside diameter of the barrel 100 of FIG. 6. In a preferred embodiment, this dimension is 5 mm.

The aperture plate 106 as shown in FIG. 7A has a thickness of a dimension K which, in preferred embodiments, is 0.10 mm±0.01 mm. A central aperture of diameter L is formed in the spacer 106 and has a dimension of 0.75 mm±0.025 mm. Using the components of the preferred embodiment described herein a lens assembly is produced with an F number of about 11.

Figure 8:
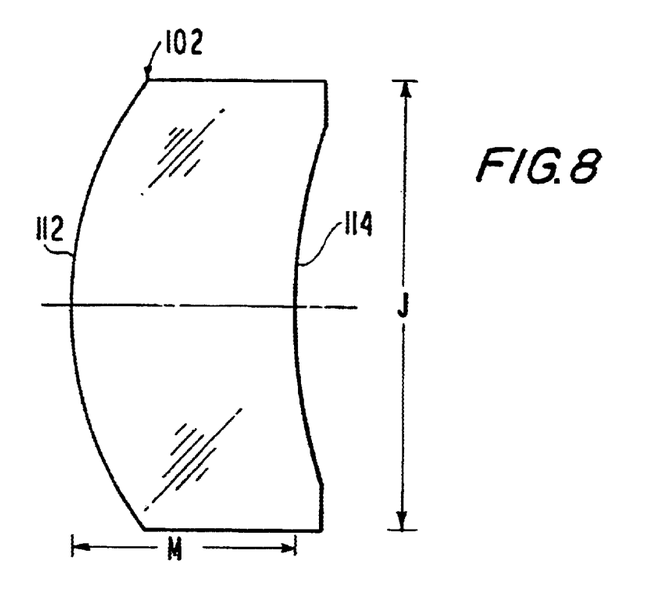
FIG. 8 is a sectional view of a lens element used in the lens assembly of FIG. 6.

A lens element 102 is depicted in cross sectional view in FIG. 8, it being understood that the other lens element 104 of FIG. 6 is essentially identical to this lens element. The lens element 102 has a spherical polished convex surface 112 and a spherical polished concave surface 114. In preferred embodiments of the present invention, the radius of curvature of these spherical surfaces is 8.86649 mm. The thickness of the lens element of FIG. 8 is indicated by the dimension M which in preferred embodiments may be 2.552 mm±0.05 mm.

In preferred embodiments of the present invention, the signal processing algorithms and optics of the imaging engine are jointly designed to yield optimum system performance, implemented with a small imaging ring unit, and associated decoder. While prior art imaging devices for optical code readers have been designed using lenses originally designed for cameras to produce sharp in-focus images, this approach is not deemed necessary where appropriate steps are taken to provide proper signal processing for the imaging engine. Traditional "in focus" lens design techniques are not necessarily relevant to the problems presented by optical code reader design. The signal processing algorithms employed with the optical code reader of the present invention are designed to be tolerant of blurred images. The main optical design approach is to maximize working range of the system such that through the focus Modulation Transfer Function (MTF) at a spacial frequency is above some preset threshold. The net effect is a trading of focus and sharpness for small unit size and greater depth of field. The result of these design considerations is a very small and inexpensive objective lens assembly and ring unit.

III. Illumination

As previously noted, in one embodiment of the present invention a plurality of light emitting diodes 35 are provided on the illumination board 33. Light emanating from the light emitting diodes 35 is projected through apertures or lenslets 9 in the front face 7 of an imaging ring unit.

Various configurations of the field of illumination may be obtained with combinations of various types of laser or light emitting diodes of different intensity or different illumination pattern divergence. Additionally or alternatively, various lenses or lenslets can be used in conjunction with the multiple light emitting diodes in order to produce the desired multiple fields of illumination and to achieve the requisite degree of uniformity in those illumination fields. Moreover, one or more laser diode arrays may be employed to provide a compact illumination system. Multimode laser diodes may be used to cancel speckle noise in the illumination pattern. An illumination system of this type is also described in commonly assigned U.S. patent application Ser. No. 09/096,578, the disclosure of which is incorporated herein by reference, in its entirety.

An illumination system should provide adequate illumination over a range of distances. The above described embodiments of the illumination system can utilize a low broad beam at close distances. At longer distances, a narrower higher beam can be switched on. Though the higher beam may produce a somewhat uneven illumination pattern, this illumination pattern can be accommodated by imaging processing algorithms which will compensate for known variations in illumination from the diode sources.

V. Electrical Arrangement-System Control Data Flow And Power Supply

Figure 9:
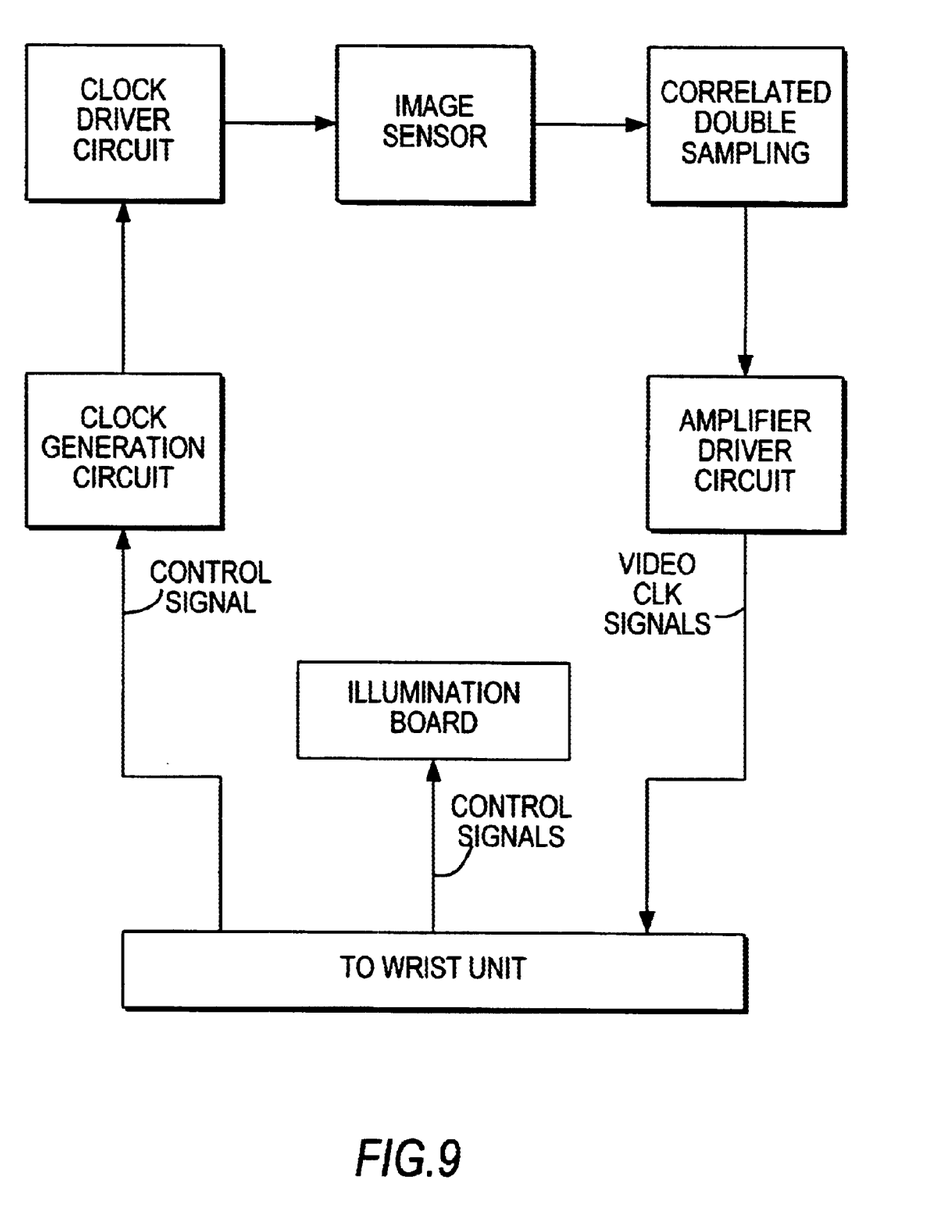
FIG. 9 is a block diagram of an imaging unit made in accordance with a preferred embodiment of the present invention.
Figure 10:
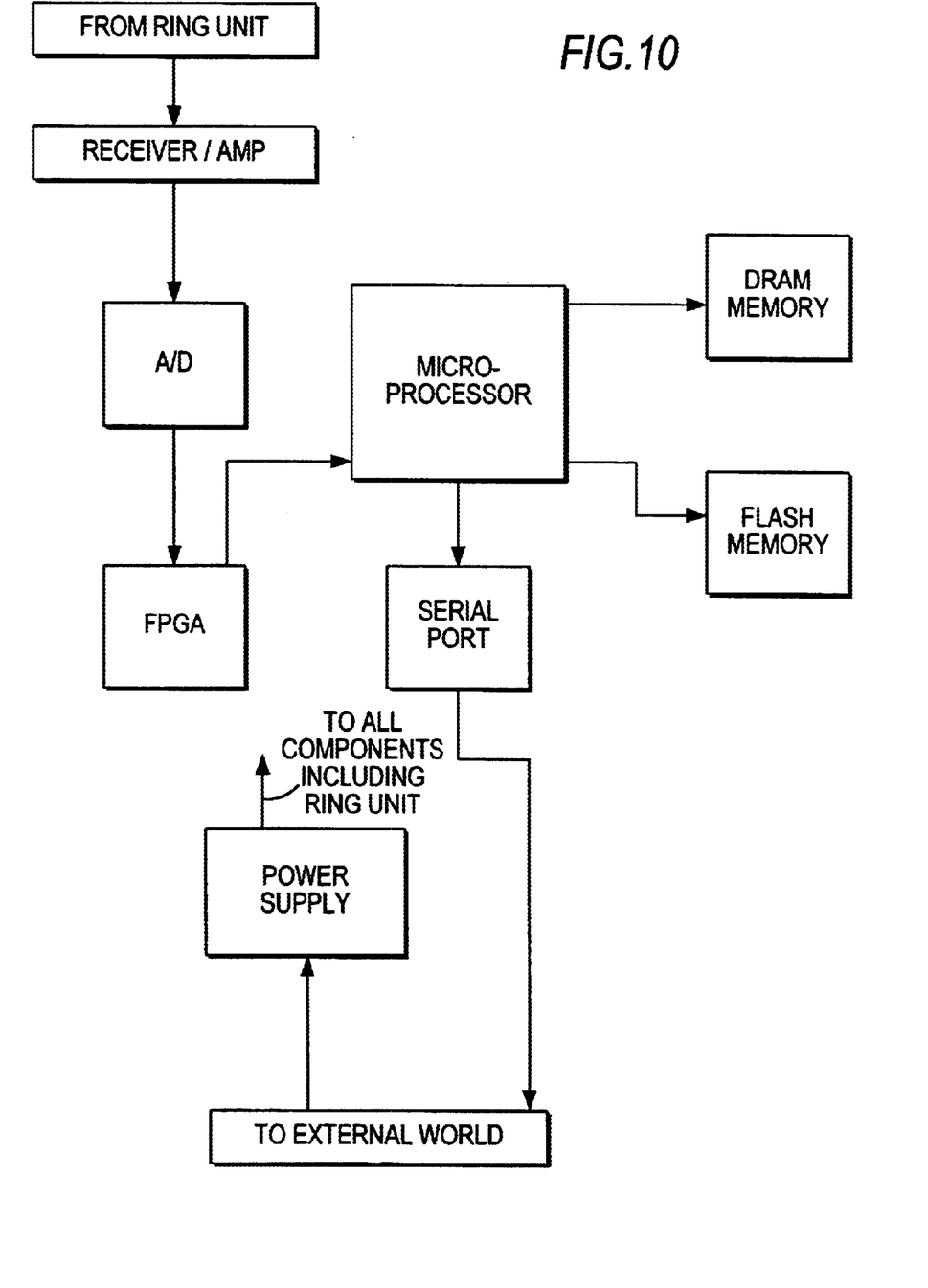
FIG. 10 is a block diagram of a decoder unit made in accordance with a preferred embodiment of the present invention.

As illustrated in FIGS. 9 and 10, the imager/decoder electronic hardware includes two major electrical subsystems: an imaging subsystem and a decoding subsystem. The imaging subsystem includes an area image sensor (e.g.—a CCD), timing generator circuitry, correlated double sampling circuitry, an amplifier driver circuitry. The decoding subsystem is constructed around a microprocessor unit. In preferred embodiments the microprocessor is an IBM manufactured PowerPC (403 Series). The PowerPC is a 32 bit RISC embedded controller which provides high performance and functional integration with low power consumption. Other components of the decoding subsystem include a power supply and power supply control circuitry, a receiver/amplifier, analog-to-digital converter, FPGA, a flash ROM, DRAM, and an I/O device, such as a radio transmitter, an 8 bit bidirectional parallel port, 16 user/system single bit I/O's, and required glue logic.

As shown in FIG. 9, electronic signals from the CCD image sensor are applied to correlated double sampling circuitry and amplifier driver circuitry to produce an analog output signal which is transmitted to the decoder subsystem. Alternatively, an analog-to-digital converter may be incorporated into the imaging subsystem, such that analog signals generated by the CCD are first converted to digital signals, then transmitted to the decoder. The CCD detector is provided with power from an external source, as well as clock driver signals by the clock driver circuitry. Various sync pulses and control signals are applied to a clock generator from an FPGA on the decoder board.

FIG. 10 is a block diagram of a logic or decoder circuit board employed in a preferred embodiment of the present invention. The heart of the logic board is a microprocessor. Analog signal received from the ring unit scanner are converted into digital signals by the analog-to-digital converter. Digital signals are then supplied to the microprocessor by the FPGA circuit. The FPGA also provides control signals from the microprocessor for the illumination system. The microprocessor also provides information to systems external to the imaging scanner via the I/O device or serial port. In one embodiment video images may also be transmitted, especially to the serial port of PC or terminal to permit display or recording of the image incident on the imaging sensor.

The micro-processor may also communicate by data line to Flash memory and DRAM memory on which data and software for the system are stored. This information may include decoded data from a target optical code.

V. Signal Processing and Decoding

Figure 11:
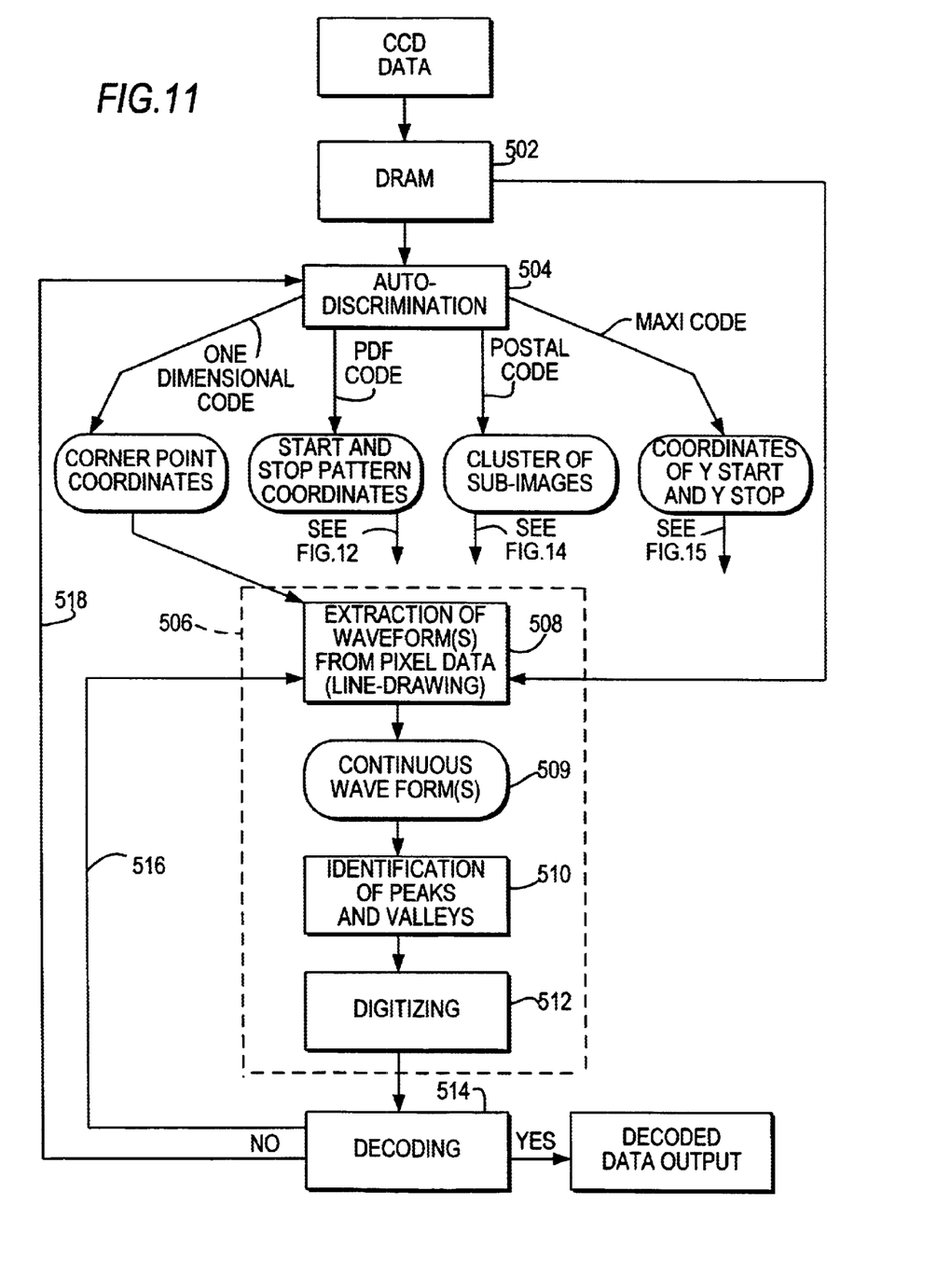
FIG. 11 is a combined flow chart and system block diagram illustrating the processing and decoding of CCD data in a preferred embodiment of the present invention.

FIG. 11 is a combined flow chart and system block diagram illustrating the processing and decoding of CCD data in a preferred embodiment of the present invention. CCD data obtained by the image sensor circuitry is indicated at 500. This data may be in the form of electronic signals corresponding to a two-dimensional array of pixel information for a target image. The data may be stored for subsequent processing in the DRAM of the optical code reader. It will be understood that the processing software which implements the processes of FIGS. 10 to 14 may have access to the stored image data at all levels. At various processing steps, portions of the pixel data may be called up for further processing or to confirm on-going analyses.

The pixel data may be divided into subimages, for example, 32×32 pixel subimages. These subimages are analyzed for properties known to be associated with various types of optical codes and known to distinguish a particular code from other codes and environmental (non-code) images. More particularly, a process of statistical Autodiscrimination may be employed. In statistical Autodiscrimination the image is divided into sub-images or sections and some statistic computed for each section. Subimages with similar statistics can be grouped to form regions of interest or clusters which may contain codes. The advantage of the statistical approach is that once the statistics are compiled, only the sub-images need to be processed, significantly reducing the computation requirements. In addition, the compilation of the statistics is simple and can be done in hardware for super fast systems. The statistic used in preferred embodiments is a histogram of local surface orientations. The statistics can be obtained by analyzing surface tangents to cluster the subimages. Once a cluster is identified, the image data may be further analyzed to detect the presence of tangents associated with particular types of optical codes. Statistical Autodiscrimination is a subject of a U.S. patent application entitled Autodiscrimination And Line Drawing Techniques For Code Readers Ser. No. 09/096,348 assigned to Symbol Technologies, Inc., which application is hereby incorporated by reference. Alternatively, a neural network can be used to discriminate image areas of possible interest as containing optical code. A neural network can also be designed to look directly at the input image.

In preferred embodiments, Autodiscrimination software executed by the system microprocessor determines which subimages clusters contain codes of a particular type and the coordinates in the pixel data array of certain boundaries or features of preliminarily identified code areas. This system is indicated at 504. As shown in FIG. 11, the image data may be preliminarily designated as a one dimensional code, two dimensional code, Postal Code or MaxiCode, it being understood that other code types with recognizable statistical patterns could be identified at this stage of processing. The remainder of FIG. 11 illustrates a processing scheme for a one dimensional code. Processing schemes for the other types of code are illustrated in FIGS. 12 through 15.

The Autodiscrimination function 504 provides the coordinates of ends or boundaries of subimages designated as being a one dimensional barcode. More specifically, the Autodiscrimination function may provide cluster and orientation information by providing the coordinates of the corner points defining a parallelogram of pixel information identified as containing a one dimensional barcode. Further processing indicated at 506 produces a digitized version of the code. More particularly, the function at 508 extracts one or more waveforms from the data in image areas of interest. This processing involves analysis of pixels near lines selected by the system (line drawing). This process is described in detail in the above mentioned U.S. patent application Ser. No. 09/096,348. The result of this process is a continuous waveform 509 produced from pixel grey scale information in a relatively "wide" line or swath of pixels drawn across the one dimensional code along its principal axis as determined preliminarily by the Autodiscrimination function 504. Peaks and valleys in the waveforms are identified as indicated at 510. Digitizing converts this information to electronic signals corresponding to the data or bit content of the image as indicated at 512. Digitizer processing is described in U.S. patent application Ser. No. 09/096,164, for Digitizing Bar Code Symbol Data, which is hereby incorporated by reference. The digitized output is then translated at 514 to provide a translated data output. The signal line at 516, indicates the possibility of calling for the extraction of data from a different line drawn across the same one dimensional data. A failure to decode any line drawn may be used to trigger additional autodiscrimination in a further attempt to identify and locate a target code as indicated by line 518.

The image processing circuitry/software may be employed to analyze a portion of the projected aiming pattern in the pixel information produced by the image sensor. This information may be used to provide feedback to the processing circuitry to help identify an image area in which a target barcode is located. Such image processing may also be used for determining the distance between the reader and the target barcode. This information, in turn, may be used to select an illumination level for a subsequent image to be decoded, and to control the illumination source.

Figure 12:
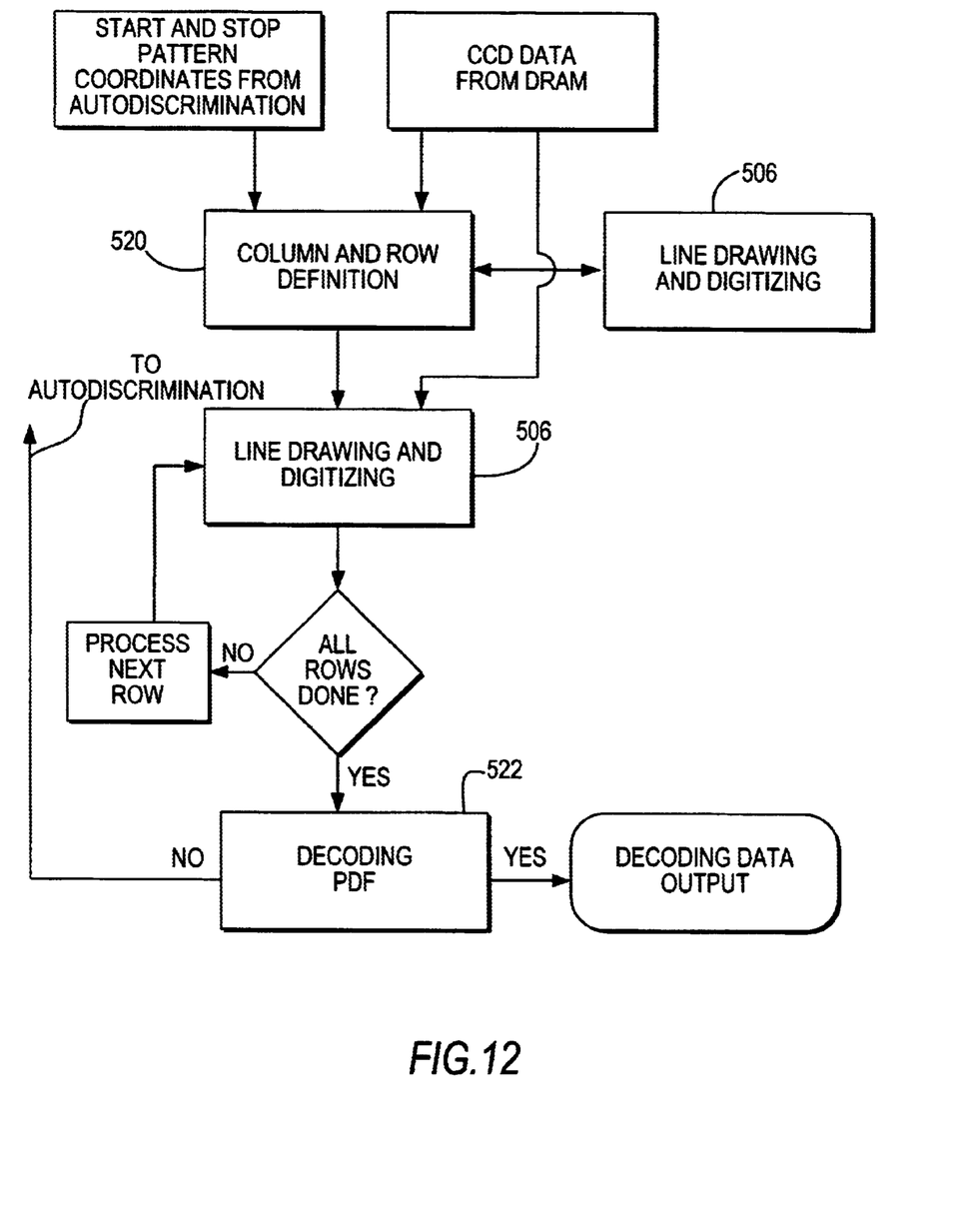
FIGS. 12, 13, 14 and 15 are flow charts illustrating the processing and decoding of two dimensional pixel data.

FIG. 12 is a simplified flow chart illustrating the processing and decoding of two-dimensional pixel data identified by the Autodiscrimination function 504 as being two dimensional code such as PDF. Column and row definition is performed at 520. In the course of this processing, the wide line drawing and digitization processing identified at 506 in FIG. 10 may be called up to process portions of the pixel data from the DRAM. Once the column and rows of the code are defined, data may be sequentially extracted from the full length of the code rows by the processing algorithms of block 506. When data has been extracted from the rows of interest, translation may be attempted as indicated at block 522. If translation is unsuccessful, process control may be returned to the Autodiscrimination function to select another code type and/or cluster of subimage pixels for analysis.

Figure 13:
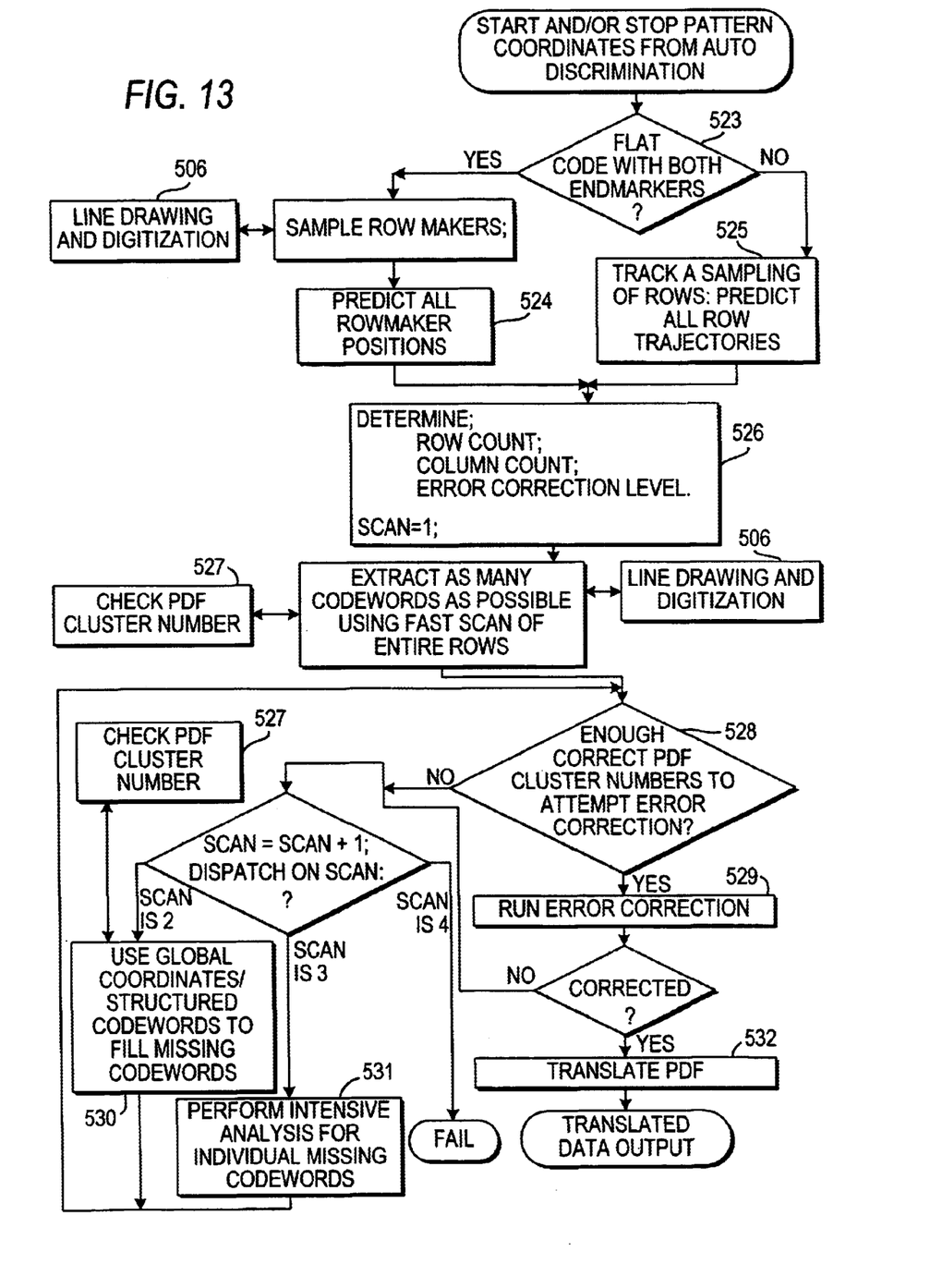

FIG. 13 is a more detailed flow chart illustrating a preferred technique for processing and decoding PDF Code. Generally speaking, the illustrated processing applies successively more computationally intensive processing as difficulty in decoding degraded images is encountered. As before data indicative of a cluster of subimages potentially containing PDF Code are provided by the Autodiscrimination function. This data may be start and/or stop pattern coordinates. At 523, a determination is made as to whether the subimage cluster is a flat code with both end markers. If it is, the PDF Code row markers are sampled, during which the processing calls the line drawing and digitization subroutine 506, discussed above. From this all row marker positions are predicted at 524.

If the code is not flat or lacks one or both end markers, a sampling of rows is tracked and row trajectories are predicted as indicated at 525. Conventional PDF decoding techniques trace straight lines across the rows in a PDF symbol. When the PDF image is distorted (tiled and/or twisted), a single straight line may cross too many rows to allow decoding. Accordingly, the processing of a preferred embodiment breaks this single line into local line segments which then enables independent decoding of code words. The entire PDF image may be examined to determine whether and to what extent this technique will be employed.

Processing converges at 526 from functions 524 and 525 in the determination of row count, column count and error correction level information embedded in the PDF row markers. The error correction level data may be used later to determine whether to run error correction and what type of error correction to attempt.

The line drawing and digitization subroutine 506 may again be used to extract as many code words as possible using fast scans of entire rows. PDF cluster numbers may be checked by calling the subroutine 527. If enough correct PDF cluster numbers are identified at 528, a determination may be made to perform error correction processing 529.

If not enough correct PDF cluster numbers are identified, the processing is incremented to scan=2. At scan=2, global coordinates and structured code words are used to fill missing code words. In conventional PDF decoding, decoders attempt to decode code words one by one in a scan line. If the decode effort fails in a code word, it may be difficult to resume decoding the next code word because of uncertainty of the location of the boundary of the next word. This problem when encountered could be obviated by decoding in a reverse direction along the row from a region of high confidence (e.g. a start/stop pattern). Alternatively, as indicated at 530 known positions of adjacent rows and code words can be used to predict the start of code words in a damaged row. The decoding can be verified by a call to check the PDF cluster numbers obtained.

If, after scan=2, the processing has still not identified enough correct PDF cluster numbers, the processing is incremented to scan=3. At scan=3, intensive analysis is performed to decode individual missing code words at 531. In preferred embodiments, good code words are mapped. As to areas containing bad code words, more complex two dimensional processing is applied in an attempt to extract the missing code words. If after this, not enough correct PDF cluster numbers are obtained, the scan marker is incremented to 4, indicating a decoding failure. In response to a decoding failure, process control may be returned to the Autodiscrimination function 504 to redetermine code type or start/stop pattern coordinates. Alternatively, more processing time may be allocated to the decoding functions of FIG. 13. Further, alternatively, new image data may be acquired and processed by the Autodiscrimination function. If error correction is successful, corrected data may be translated at 532.

Figure 14:
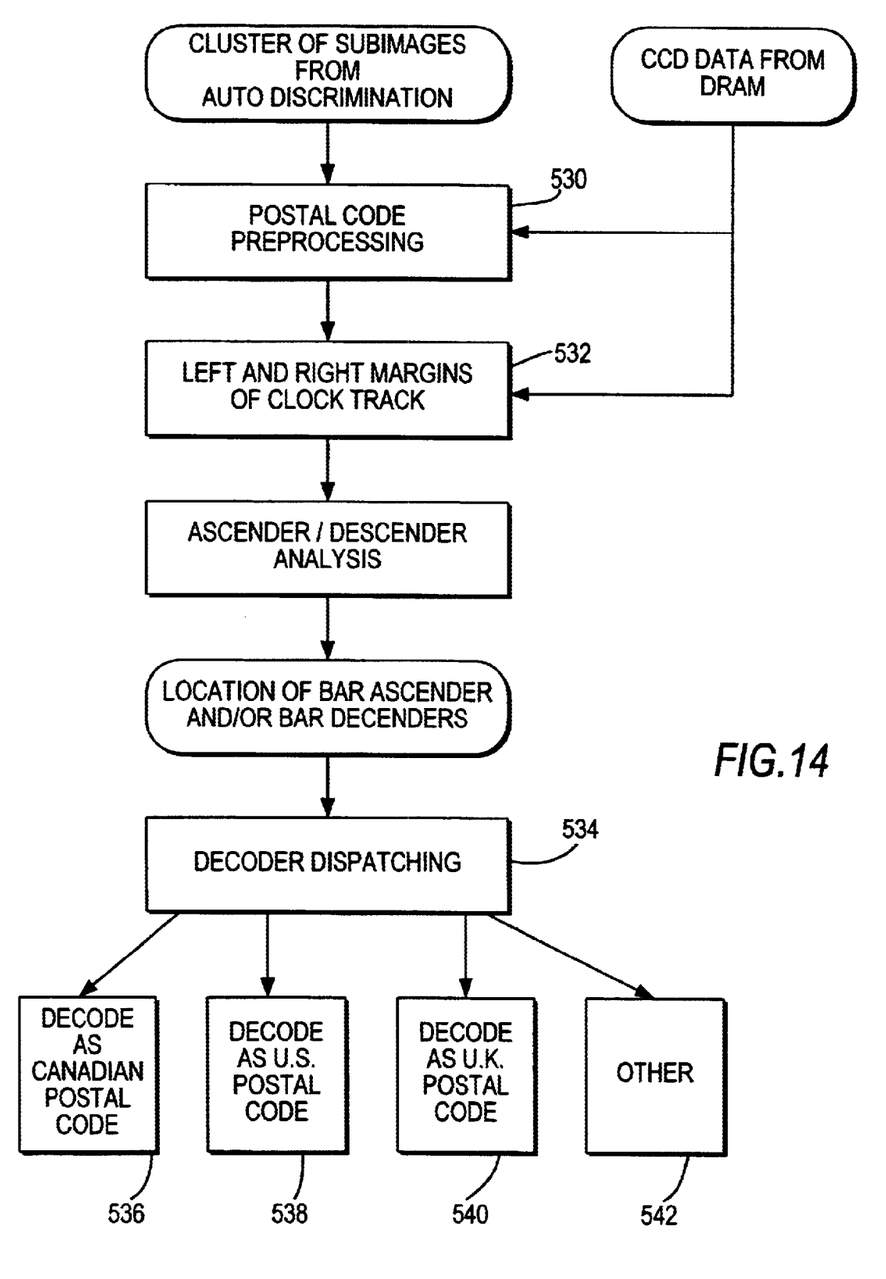

FIG. 14 is a flow chart illustrating the processing and decoding of two dimensional pixel data identified by the Autodiscrimination function as being Postal Code.

A cluster of Postal Code subimages from the Autodiscrimination function is preprocessed at 533, to determine the presence of and the left and right margins of a Postal Code clock track. The end points of a line crossing the postal code clock track from the first to the last bar are the output of the postal code preprocessor. In preprocessing the code is assumed to be oriented along a line of subimages with the strongest correlation or similarity. Left and right subimages are searched to identify left and right bars (not necessarily the first and last bars of the code). The processing then attempts to identify bar regularity indicative of a clock track between the identified left and right bars. The high aspect ratio of the clock track makes it difficult to find the first and last bars of the clock track on the first try. Therefore, the preprocessing proceeds interactively until the first and last bars of the clock track have been identified, by realigning the initial estimate of the clock track.

Once the left and right margins of the clock track have been located, the data is further analyzed by a line-walking algorithm at 534 to determine the location of bar ascenders and/or bar decenders. Based on this information a decoder dispatcher 535 makes tentative determinations as to the type of Postal Code involved. The ascender/descender location data is passed to an appropriate translation function 536 through 542 and translation is attempted. If translation is unsuccessful, process control may be returned to the decoder dispatcher to select another Postal Code type, or returned to the Autodiscrimination function 504 to select another code type and/or cluster of subpixels for analysis.

Figure 15:
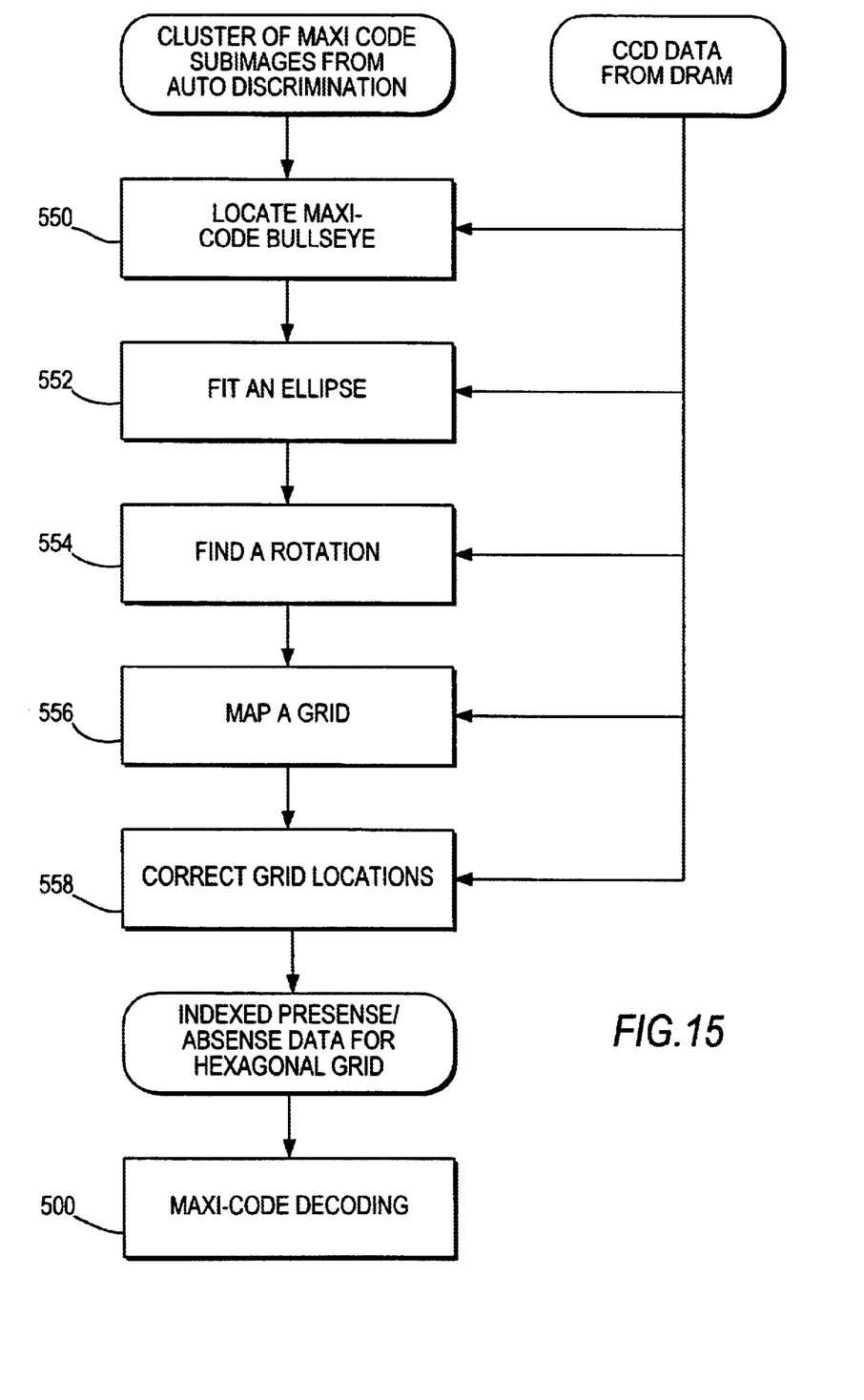

FIG. 15 is a flow chart illustrating the processing and decoding of two dimensional pixel data identified by the Autodiscrimination function 504 as not being one of the other types of code previously discussed and having a contrast variation within predetermined limits. In this processing, cluster data may be accepted line by line. The system first attempts to locate a MaxiCode bullseye at 550 by analyzing the pixel data in non-parallel run directions for patterns indicative of concentric rings. An ellipse is then fitted to the inside edge of the outermost black ring at 552. The rotation of the grid is determined from the location of the 18 orientation hexagons in the image as indicated at 554. A bilinear transformation is calculated to account for tilt of the target code and to map a grid, at processing step 556. Grid locations are corrected progressively outwardly by shifting hex centers to better fit the pixel data, as indicated at block 558. The result of this processing is indexed presence/absence data for the hexagonal MaxiCode grid. This data is passed to the MaxiCode translating function at 560. If the MaxiCode decoding or translating fails during the processing of FIG. 15, process control may be returned to the Autodiscrimination function 504 to select another code type and/or cluster of subimage pixels for analysis.

The processing techniques exemplified in FIGS. 11 through 15, may be used in the system decoder unit 3 to obtain translated data from signals corresponding to a two-dimensional array of pixel information from a field of view of the imaging engine 2 mounted in the ring unit 1.

The described embodiments of the present invention are intended to be illustrative rather than restrictive, and are not intended to represent every embodiment of the present invention. Various modifications and variations can be made to the disclosed invention without departing from the spirit or scope of the invention as set forth in the following claims both literally and in equivalents recognized in law.

We claim:

1. A compact imager for electro-optically imaging a target, comprising:
   a) an objective lens for directing light from the target along an optical axis;
   b) a printed circuit board carrying electrical circuitry and lying in a plane generally parallel to the optical axis;
   c) a solid state, two-dimensional image sensor electrically connected to the circuitry and mounted on the board in a plane generally parallel to the optical axis and the plane of the board;
   d) a reflective element overlying the image sensor and inclined relative to the optical axis, and operative for reflecting the light directed by the lens toward the board and to the image sensor for enabling the image sensor to image the target, said reflective element and said lens having respective heights equal to each other as measured in a direction perpendicular to the board;
   e) a housing in which the lens, the image sensor and the reflective element are contained; and
   f) means for mounting the housing on a finger of a user.

2. The imager of claim 1, wherein the image sensor is arranged in a horizontal plane.

3. The imager of claim 1, wherein the circuit board has a horizontal surface, and wherein the image sensor is mounted to the horizontal surface.

4. The imager of claim 1, further comprising a chassis to which the lens and the reflective element are mounted.

5. The imager of claim 1, wherein the objective lens comprises one or more spherical lens.

6. The imager of claim 1, wherein the objective lens comprises an aperture less than 1/10 inch in diameter, two concave-convex plastic lens elements with spherical convex surfaces and diameters less than ½ inch, and snap fitting means for aligning the lens elements along the optical axis in a mirror-symmetrical relationship.

7. The imager of claim 1, wherein the reflective element comprises a mirror.

8. The imager of claim 1, wherein the solid state image sensor is a charge coupled device chip mounted to the circuit board.

9. The imager of claim 1, further comprising a finger-actuated trigger extending from the housing.

10. The imager of claim 9, wherein actuation of the trigger initiates reading of the target bearing a symbol.

11. The imager of claim 1, further comprising decoding circuitry contained in a decoder unit remote from the housing and worn by the user, and wherein the decoder unit is configured to identify and decode various types of code symbols on the target.

12. The imager of claim 1, wherein the housing has a length no greater than an upper phalange of the user's finger.

* * * * *